Oct. 9, 1934. W. B. FOSTER 1,976,443
DOUBLE BED COUCH
Filed Dec. 12, 1932 5 Sheets-Sheet 2

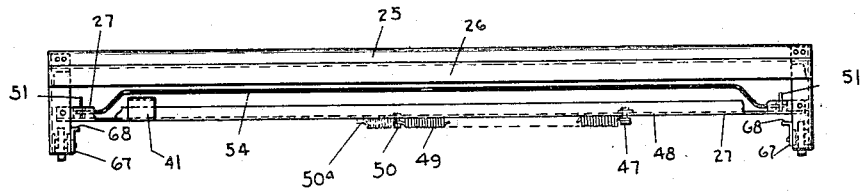
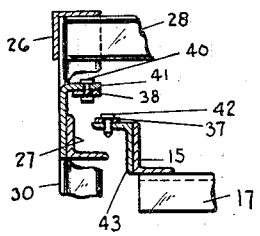
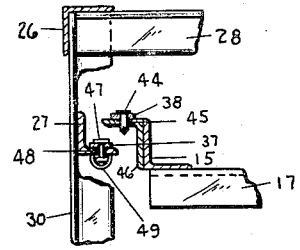
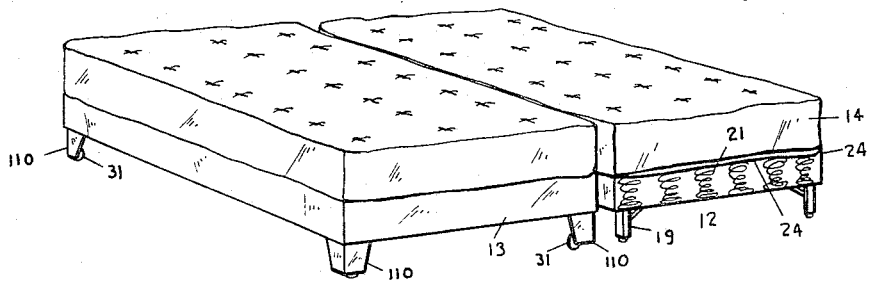
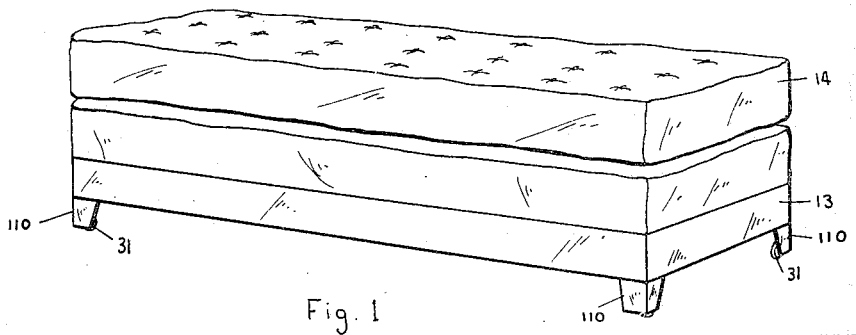

INVENTOR
William B. Foster

BY Martin & Rendell

ATTORNEYS

Oct. 9, 1934.  W. B. FOSTER  1,976,443
DOUBLE BED COUCH
Filed Dec. 12, 1932  5 Sheets-Sheet 3

INVENTOR
William B. Foster
BY Martin & Rendell
ATTORNEYS

Oct. 9, 1934.  W. B. FOSTER  1,976,443
DOUBLE BED COUCH
Filed Dec. 12, 1932  5 Sheets-Sheet 4

INVENTOR
William B. Foster
BY Martin & Rendell
ATTORNEYS

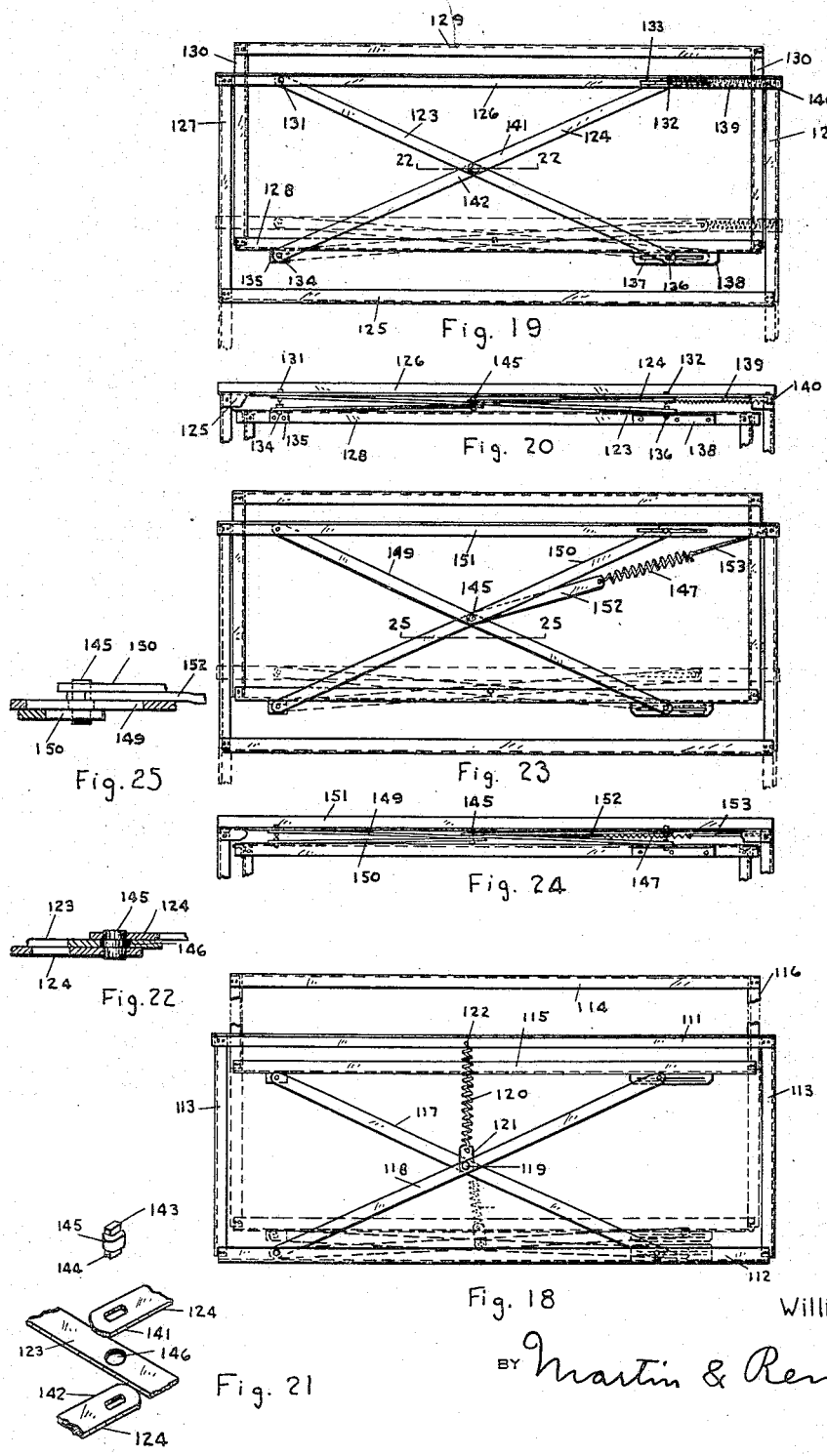

Patented Oct. 9, 1934

1,976,443

UNITED STATES PATENT OFFICE 1,976,443

DOUBLE BED COUCH

William B. Foster, Utica, N. Y., assignor to Foster Brothers Manufacturing Company, Utica, N. Y., a corporation of New York Application December 12, 1932, Serial No. 646,756

1 Claim. (Cl. 5—17)

My present invention relates to a double bed couch; that is a structure having two bed sections which may be closed to form a couch or extended to form a double bed.

The purpose of this invention is to provide a double bed couch of new, simplified and improved construction and particularly to provide a construction wherein the two bed sections are separate and independently supported upon the floor so that the two bed sections can be entirely separated if desired to form twin beds or can be simply moved to extended but still connected position with each bed section supported only by its own legs.

Further purposes are to provide a structure where equalizing mechanism preferably in the form of crossed levers are provided directly connecting the two sections so as to hold the sections parallel at all positions and to prevent relative endwise movement of the sections; and to have the connection of said equalizing levers to one of the sections readily detachable and attachable so that the sections may be used as separated or twin beds, and further to provide a structure where, although the sections are entirely independent and disconnected except for said equalizing levers, there will be co-operating brackets or recesses on one section, engaging projections on the other so that when the structure is closed it may be readily lifted and transported without the parts becoming disassembled.

Further purposes and advantages will appear from the specification and claim herein.

Fig. 1 is a perspective view of a double bed couch embodying this invention, the sections being shown in housed or telescoped position with the loose cushion thereon and forming a couch.

Fig. 2 is a perspective view on the same scale, but with the sections extended but still connected and with the loose cushion in place upon the lower section so as to form a double bed.

Fig. 5 is a front elevation of the longer and higher bed section shown in Fig. 3.

Figure 6:
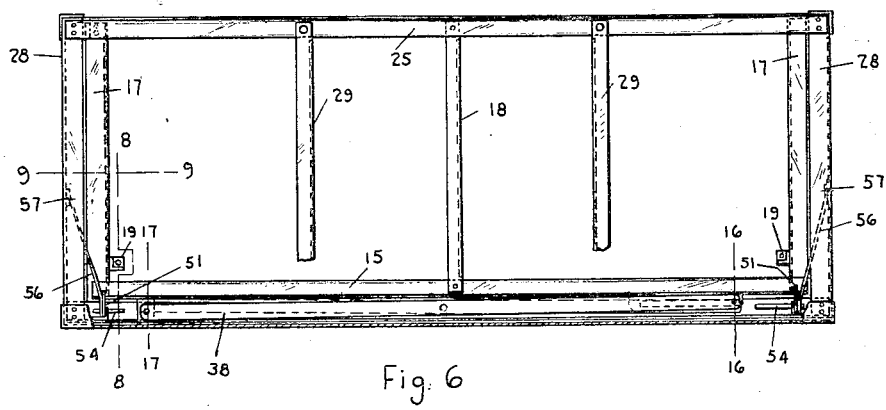
Fig. 6 is a plan view of the two bed sections shown in Fig. 3 in closed or telescoped position.
Figure 4:
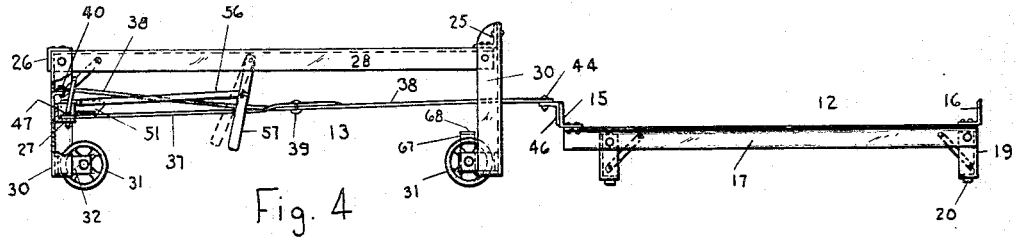
Fig. 4 is an end elevation of the right hand end of the parts shown in Fig. 3 on a somewhat larger scale.
Figure 7:
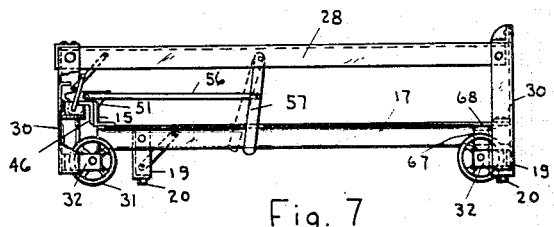
Figure 10:
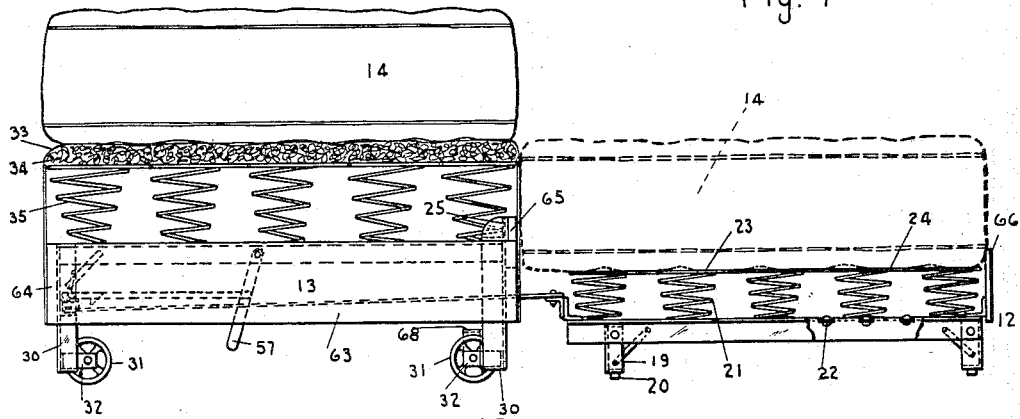
Figure 8:
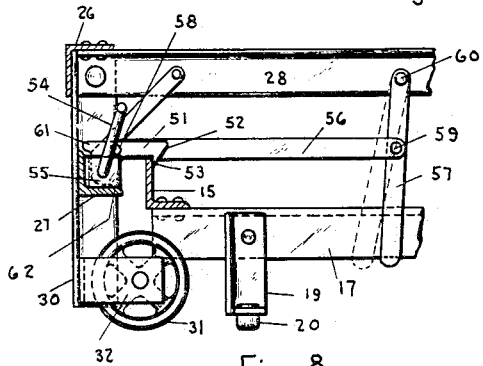
Figure 9:
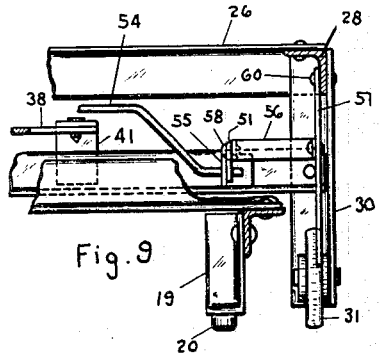

Fig. 7 is a view similar to Fig. 4 but with the sections closed. Fig. 8 is a vertical sectional view on an enlarged scale on line 8—8 of Fig. 6 and Fig. 9 is a vertical sectional view on line 9—9 of Fig. 6 also on an enlarged scale. Fig. 10 is an end view similar to Fig. 4, but showing the spring structure of the lower section and the spring structure and (in section) the upholstering of the higher section; also the thick separate cushion is shown in full lines on top of the higher section and in dotted lines on top of the lower section.

Figure 11:
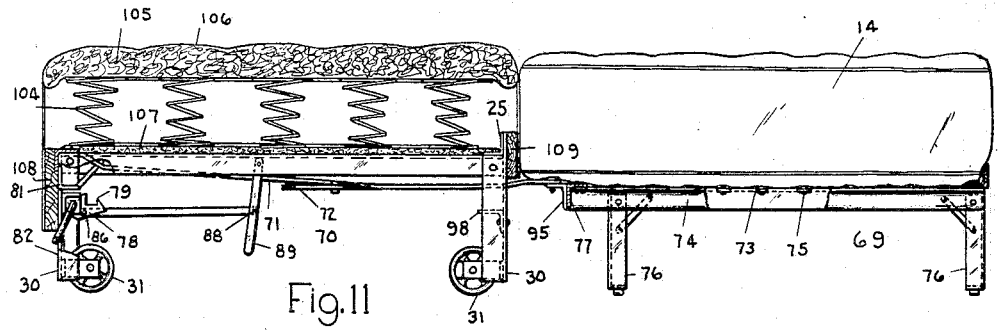

Fig. 11 is a view partly in end elevation and partly in vertical cross section of a modification where the lower and relatively stationary section instead of having a spring structure has a link fabric or flat fabric structure to form its supporting surface.

Figure 12:
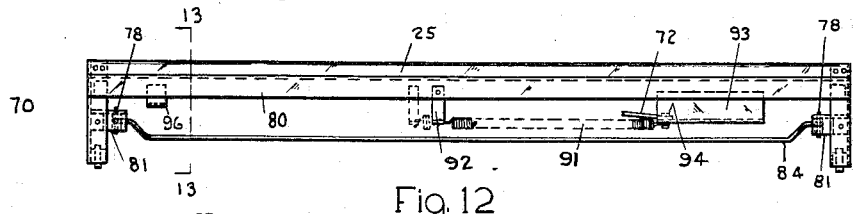

Fig. 12 is a front view of the front or higher bed section of Fig. 11.

Figure 13:
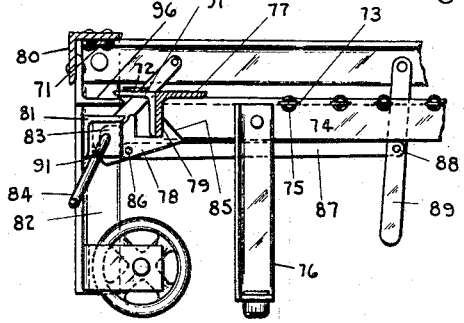

Fig. 13 is a vertical sectional view on line 13—13 of Fig. 12, but with the bed sections closed.

Figure 15:
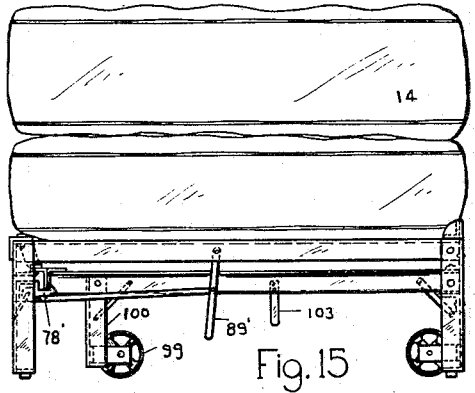
Figure 14:
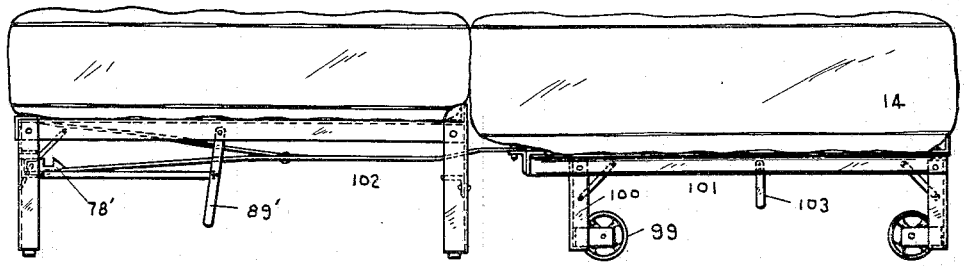

Fig. 14 is a view similar to Fig. 11 but of a modified form where the lower section is the movable section and Fig. 15 shows said couch closed.

Figs. 16 and 17 are detailed sectional views respectively showing the parts immediately on lines 16—16 and 17—17 of Fig. 6.

Fig. 18 is a plan view of another form of double-bed couch embodying my invention.

Figs. 19 and 20 are respectively plan and partial front views of another modified form.

Fig. 21 is a perspective view on an enlarged scale and before assembling of the double ended rivet 145 and of the three parts to be connected thereby and Fig. 22 is a vertical sectional view on an enlarged scale on line 22—22 of Fig. 19.

Figs. 23 and 24 are views similar to Figs. 19 and 20 of a still further modified form of the invention.

Fig. 25 is a vertical sectional view on an enlarged scale on line 25—25 of Fig. 23.

Referring to the drawings in a more detailed description and first to the form shown in Figs. 1 to 10, it will be seen that a double bed couch of this invention comprises two complete and independently supported bed sections 12 and 13 and means for normally operatively connecting said sections and maintaining them in parallel position and free from relative endwise motion and lastly in the complete form of the invention a relatively thick loose or separate cushion 14 of the length and width of the higher and larger bed section 13.

Each bed section is complete and independently supported upon the floor and has a separate complete frame, four floor-engaging legs and a supporting surface consisting as desired of link or flat fabric with the usual tension springs therefor or of coiled upholstery or bed springs.

The shorter and lower bed section 12 has its frame composed of front and rear angle side rails 15 and 16 connected by end angle bars 17 and preferably also by an intermediate cross bar 18. On this frame at its four corners there depend the four legs 19 which in the embodiment of the invention shown in Figs. 1 to 13 are provided at their extremities with friction members such as rubber pads 20 which aid in holding this lower section securely upon the floor when the other or higher section 13 is moved relative thereto.

This lower bed section 12 is provided with a suitable supporting surface such as shown in Fig. 10 as composed of a plurality of vertically arranged coiled springs 21 supported at their bottom on suitable cross bars 22. About the outer edges of the top coils of these springs extend the usual edge wire 23. Over the top surface of this spring structure there will usually be placed a fabric covering 24.

The higher and longer bed section 13 has its frame composed of a rear side rail 25, top and bottom front rails 26 and 27 respectively, opposite ends 28—28 and preferably also intermediate cross bars 29—29. At the corners of this frame are provided the four legs 30. In the embodiment of this invention as shown in Figs. 1 to 13 the lower ends of the legs of this section are provided with anti-friction members preferably relatively large wheels 31 conveniently and preferably mounted on fixed horizontal axes extending longitudinally of the bed section. This is conveniently accomplished by forked brackets 32 secured to the respective legs and carrying the wheels in the open ends of the forks which conveniently extend from the respective legs towards the legs on the other side of the frame.

The bottom front side rail of this section is secured at its opposite ends to the two front legs about midway of their height.

Figure 3:
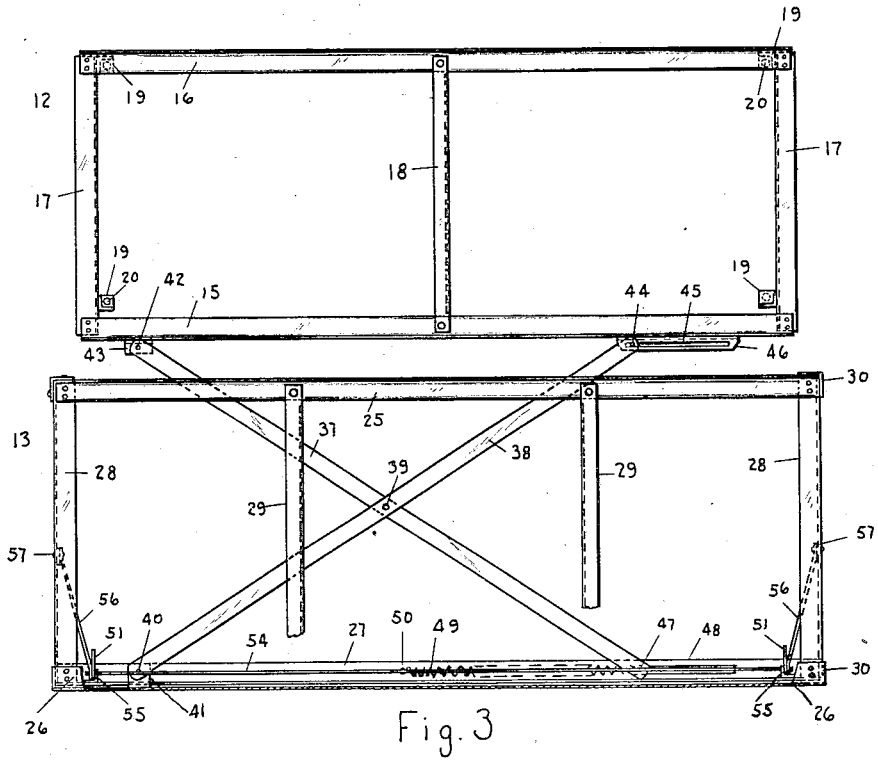
Fig. 3 is a top plan view on a slightly enlarged scale of the said construction with the sections extended, but for the sake of clearness omitting the cushion, the upholstery, the wood tacking strips and the coiled spring or spring fabric supporting surfaces used in the complete article.

As already implied and as appears from Fig. 3, the section 12 is shorter than the section 13 and is also lower than the space beneath the back side rail 25 of the section 13 so that the section 13 may be moved relative to the section 12 from the position shown in Fig. 3 to cause the said section 12 to be housed within and beneath the section 13.

Fig. 6 shows a plan view of the two sections in this closed or telescoped position and Fig. 7 is an end view of the two sections in said closed or telescoped position. The section 12 is just enough shorter than the section 13 to allow the said section 12 to clear the legs at the back of the larger and longer section 13 when the two sections are being closed or extended. As especially efficient mechanism is provided for equalizing the two sections when in relative motion as hereinafter provided and for preventing endwise motion of the two sections, the amount of this clearance or difference in length between the shorter section and the longer section needs to be only a small amount, that is, just enough to clear the legs of the longer section and is not enough to practically interfere with the shorter section 12 forming a full length bed section.

Similarly, the section 12 has its parts so proportioned that its supporting surface as the tops of the coiled springs 21 is considerably lower than the bottom surface of the back or rear side rail 25 of the higher section 13. This allows the said sections to be closed or telescoped as by the larger section 13 being moved back over the lower section 12 without interference between adjacent parts of either section.

The supporting surface of the higher and larger section 13 as shown in Figs. 1, 2 and 10 is formed by the top fabric layer 33 over the fibrous or other filling 34 placed on top of the set of vertical coiled springs 35 carried upon suitable cross bars which in turn are supported at their ends upon the back rail 25 and the top front rail 26 of this section.

In this invention as shown in Figs. 1 to 13 the smaller section 12 is intended to remain stationary upon the floor while the larger section 13 is the movable section and is provided with the anti-friction members upon its legs such as the large wheels 31. In practice accordingly the smaller section usually remains against the wall and the movable section 13 is moved out therefrom and so is called the front section. In the description of this first form of my invention accordingly the larger section is sometimes called the front section and its movement away from the fixed section 12 is called its forward motion. It will be understood, however, that these terms are only for convenience and that as shown in Figs. 14 and 15 the larger and higher section may be the one to remain stationary upon the floor and the smaller section will be the movable section and its legs will be equipped with anti-friction members.

Referring again now to the form of the invention shown in Figs. 1 to 10, it will be seen that I have provided an equalizing mechanism normally connecting the sections 12 and 13 and causing said sections to maintain their parallel arrangement both at the open or extended position and at closed or telescoped position and also at all intervening positions. This is done to prevent the two sections moving unequally or coming to a cramped or locked position which would easily result with the two sections so closely fitting unless such equalizing means are provided.

The said equalizing means consists of a pair of crossed levers 37 and 38 centrally pivoted to each other as at 39. As shown in Fig. 3 the left hand end of lever 38 is pivoted at 40 to the frame of the larger section 13 well towards the left end of said frame as by being pinned directly to the lower front rail 27 or preferably to a small bracket 41 secured to said rail. The left hand end of the other lever 37 is similarly pivoted in effect to the front rail 15 of the lower section 12 by means of a depending pin 42 at this end of the said lever removably engaging a round hole in the horizontal web of a small bracket 43 secured to said rail 15 and projecting slightly therefrom. The engagement of the depending pin upon the left hand end of lever 37 with its co-operating part of the back section 12 is readily detachable as by raising up the said lever until the pin 42 is withdrawn from the hole in bracket 43.

The right hand end of the lever 38 is similarly provided with a depending pin 44 which slides and pivots in a longitudinally extending slot 45 provided in the horizontal web of a long bracket 46 secured to the front of front rail 15 of the back or smaller section 12 and thus this end of the lever 38 is pivotally and slidingly connected to the frame of said section 12 towards the right hand end of said section 12 and at the front thereof. The pin 44 is readily removable from the slot 45 as by raising this end of lever 38 for a purpose to be hereinafter described.

The right hand end of lever 37 is similarly provided with a downwardly extending pin 47 which pivots and slides in a longitudinally extending slot 48 provided in the horizontal web of the lower front rail 27 of the larger or front section 13. This pivotal connection is not detachable but the parts are permanently connected.

It will be seen that these crossed levers pivoted to the respective sections at one end, say the left hand end, and pivotally and slidingly connected at their other ends to said sections have a lazy tongs action obviously resulting in forming an equalizing mechanism which causes the two bed sections to be maintained in parallel relation at any positions to which the two sections may be moved and also preventing relative endwise motion between the two bed sections, thus keeping the two sections clear of each other during travel of the movable section. This mechanism also stops the movable section at its desired outward position by the sliding pins coming to the ends of their slots.

This equalizing mechanism is particularly simple, effective and durable and is simple to construct and easily operated. It obviates the necessity for previous more or less elaborate means for connecting the two sections together and allows the said sections to be in effect entirely independent separate sections and separately supported upon the floor. Having the two bed sections independent and separately supported upon the floor also enables the two bed sections to be used as actually separate beds or as twin beds because said sections can be readily entirely separated from each other by raising the rear ends of the levers 37 and 38 sufficiently to disengage the pins 42 and 44 from their respective brackets 43 and 46. Upon such disconnection, one lever as 38 will have its right hand end caught up underneath the back rail 25 provided upon the frame of the larger section. The placing of this free end of lever 38 above the back rail 25 holds the free end of both levers up the floor and out of the way. The two sections may be again co-operatively connected by bringing the two sections into proper relative position and inserting the pins 42 and 44 into their respective apertures. It is obvious that when the equalizing mechanism is so disconnected, either section may be moved as desired without having to move the other section.

Preferably in order to have a double bed couch embodying this invention of such construction and combination as to unfold more easily or practically automatically, I provide a tension spring 49 co-operatively attached to the crossed levers and to one section so as to be put under tension when the sections are closed and thus provide power tending to open the sections; that is, to move the movable section outwardly from the relatively fixed section. A convenient construction is to have one end say the left hand end of the spring 49 secured to the front lower side rail 27 as by means of headed screw 50 while the other end is hooked to the shank of the headed pin 47 which is secured to the right hand end of equalizing lever 37 and extends down through slot 48 in said lower front rail 27. An eye or hook formed in the right hand end of spring 49 is secured to the shank of said pin 47 below said rail and above the lower head of the said pin. This coiled spring is of such strength and character as to practically make the outward travel of the movable section automatic when it is desired to unfold the sections; that is to move the movable section from its position over the lower relatively fixed section. Of course the said spring is placed under tension by the pushing of the movable section back over the lower section. As relatively large anti-friction wheels 31 are used upon the movable section the movement of said section back and forth requires little power and consequently the placing of the spring 49 under tension adds relatively little resistance to the power required for moving the higher section back into telescoped position.

There will preferably be provided, however, means for positively holding the movable section in its folded position against the tendency for it to start outwardly under the tension of spring 49. These holding means include a pivotally mounted latch 51 mounted near each forward corner of the movable or higher section 13 as appears particularly in Figs. 3, 4 and 8. These latches are of such construction and combination with the other parts of the structure as to automatically be moved when the movable section goes to closed position by reason of the upper edge of the vertical web of the front rail 15 of the lower section 12 coming into camming engagement with the slanted inward face 52 of the latch 51. This movement takes place just before the movable section comes to closed position and upon the movable section coming to closed position the hook 53 of the latch 51 again descends but now upon the inner side of the vertical web of said rail 15. The parts are then in the position shown in Fig. 8.

The two latches 51 are fixedly secured close to the opposite ends of a common rock shaft 54. Just within the opposite latches this rock shaft is mounted in brackets 55 conveniently secured to the vertical web of the lower front rail 27 and projecting rearwardly therefrom. Just inside of each bracket 55 the said rock shaft 54 is offset upwardly and inwardly relative to the axis of its ends as appears in Figs. 5, 8 and 9. This is done partly to clear other mechanism and also to provide a weight tending to hold the latches 51 in the position they have in Fig. 8, but still allow the hooked inner end of said latches to be temporarily swung upwardly during locking or unlocking of the latch. Means are provided operable from either end of the bed for unlocking both latches and for giving an initial outward movement to the movable section from its inward position. These means include a separate link 56 at each end of the couch and also a separate operating lever 57 therefor. As shown particularly in Fig. 8 the forward or left hand end of link 56 is pivotally connected at point 58 to the latch 51 above the fulcrum of said latch, namely the rock shaft 54. The other or inner end of the link 56 is pivotally connected as at 59 to the lever 57 part way down on the lever from the pivoting point 60 of said lever upon the end cross bar 28 of section 13. Assuming the sections of the couch to be in closed position as shown in Figs. 7 and 8 it will be obvious that power applied to either depending lever 57 as by the hand or more commonly by the foot of a person tending to swing the said lever forwardly will be communicated through link 56 first to swing both latches 51 on their fulcrum until the hook 53 is disengaged from the front rail 15 of the inner or fixed section at which time the forward end 61 of the latch comes into engagement with the upper surface of the vertical web of the lower front rail 27 of the movable section and prevents further swinging of the latch. The power of the hand or foot still being applied to the lower end of operating lever 57 tending to push it to the front thereupon operates to bodily move the whole movable section outwardly. This initial movement given by the operator needs only to move the outer section a few inches; that is until the crossed levers 37 and 38 cease to be practically in locked position and open to a position where the spring 49 becomes effective to continue slowly but certainly the rest of the forward motion of the movable section 13. It will be seen that an outward movement imparted to either of the operating levers 57 will simultaneously and positively unlock both latches 51. This is because each connecting link 56 is pivoted directly to one latch 51 and the other latch is locked to movement with the first latch by reason of both latches being fixed upon the rock shaft 54.

An ear 62 on the lower side of the latch 51 forms a stop engaging the horizontal web of the lower front rail 27 when the parts are in the position shown in Fig. 8 and preventing the latch from swinging in a clockwise direction any farther than the position shown in said Fig. 8. The purpose of this is to insure that the slanting or camming surface 52 will always be opposite the co-operating upper edge of the front rail 15 of the back section when the front section is moved back to closed position. This stop does not prevent the swinging of the latch in an anti-clockwise direction as required for the unlocking of said latch. Preferably the parts will be so proportioned as to have the depending lever 57 slant somewhat forwardly from vertical position about as shown in Fig. 8. When the latch is raised on the closing of the two sections this operating lever then moves about to the position shown in dotted lines in said view and at that point adds appreciably to the weight of the parts tending to move the hook 52 of the latch to downward position when the two sections come to fully closed position.

As shown in Figs. 1, 2 and 10 the forward or higher bed section 13 may be provided with finishing wood strips 63 at the opposite ends, 64 at the front and 65 at the back. The latter strip is purposely placed high enough not to interfere with the closing of the two sections. These finishing strips may be used to tack thereto the layer of fabric 33 coming down over the fiber filling 34 and around the sides of the coiled springs 35. Preferably also the back of the lower section 12 will be provided with a wood finishing strip 66. The ends of this back strip project slightly beyond the metal frame of the section and so engage the rear of the frame or legs of the higher section and serve as the positive stop on the closing movement of the two sections.

As the two bed sections are not connected except by the equalizing levers 37 and 38, the sections would come apart to a large extent vertically if the couch was lifted when its parts are closed by means of a person lifting the longer section. To overcome this and to insure that the two sections will be lifted together when being transported or when being moved about the house, I provide a pair of co-operating rests or brackets at each of the four corners of the couch so constructed that the members of the lower section will be directly over the brackets or rests of the higher or longer section when the two sections are closed. Preferably these interengaging rests or brackets do not come into actual contact with each other when the sections of the couch are closed, but are close enough together to be brought into supporting relation as soon as the lower section is raised a fraction of an inch.

As this couch is constructed the bracket 46 which slidingly receives the pin 44 of equalizing lever 38 serves as such an upper bracket upon the lower member at the front right hand end of the couch when the two sections are together by reason of said bracket being then located closely over the horizontal web of the lower front rail 27 of the longer section 13. The sliding right hand end of the other equalizing lever 37 is immediately above this horizontal web and spaced just above these two parts will be the projecting flange of the bracket 46 as appears more clearly in the detailed sectional view Fig. 16. The interengaging supporting parts near the forward left hand end of the couch are particularly shown in the detailed sectional view Fig. 17 which is a section taken on line 17—17 of Fig. 6. The parts are shown in the closed position of the two sections. It will be seen that the rearwardly projecting horizontal flange of the front lower rail of the larger section 13 forms the lower and supporting member to receive thereon the forwardly extending horizontal web of the bracket 43 which is attached to the front rail 15 of the rear section 12.

At the two rear corners of the couch the longer section 13 is provided as shown in Fig. 4 on the inner side of the legs with inwardly facing brackets 67 preferably in the shape of an elongated L with the shorter arm 68 projecting inwardly and facing upwardly. This bracket may conveniently be fastened to the inner side of the bracket 32 carrying the rear wheels 31. The projection 68 forms a support to receive thereabove a part of the frame of the lower section at its rear corner conveniently the horizontal web of the end cross piece 17 which web projects outwardly or endwise from the section as a whole.

A modified form of my invention is shown in Figs. 11, 12 and 13. In this construction the rear and shorter and narrower bed section 69 receives thereover the higher and longer forward bed section 70 in the same way as already described in detail as to the first form of my invention. The sections 69 and 70 are also connected by a similar set of equalizing levers 71 and 72. The rear section 69, however, instead of being provided with a coiled spring structure has its supporting surface formed of slats or link fabric 73 the longitudinal members of which at least are attached to the end bars 74 of the section by the usual small helical springs 75. This construction requires that the said supporting surface of this lower bed section be then carried enough higher than in the form shown in Figs. 1 to 10 of the other construction to allow the lower section 69 to form a part of a bed of comfortable height by the addition only of the loose or separate cushion 14. Accordingly the legs 76 of this section are relatively longer than in the corresponding section 12 of my first form. This placing of the frame of the rear section this much higher necessitates several changes in the details of construction and in the co-operation of parts of the two sections. One of these changes is that the front side rail 77 has its vertical web face downwardly. In order for the gravity-actuating locking latch 78 to engage a co-operating part, namely the lower edge of the front rail 77, the latch 78 has to be mounted in a correspondingly lower position and have its hook 79 face upwardly. This appears particularly in Figs. 11 and 13. In this form of my invention the higher or front bed section 70 has only one full length front side rail, namely rail 80 which is at the level of the top of the frame. Below this rail 80 the section is provided at its front with two short stub rails 81 projecting longitudinally and inwardly from the front legs 82. These appear particularly in the front view of said higher section (Fig. 12). To the inner side of the projecting ends of these stub rails are secured the brackets 83 in which are journaled the opposite ends of the rock shaft 84 which closely beyond said brackets have rigidly fastened thereto the said latches 78. Preferably as suggested in Figs. 12 and 13 this rock shaft is offset for the greater part of its length, that is all of its central portion, such offset being towards the front. The weight of this offset portion, as is apparent from Fig. 13, operates to normally hold the latch 78 in about the position shown in said figure and in such position that the cam face 85 of said latch will be engaged (when the front section is moved backward) by the downward edge of the front rail 77 of the back section. Accordingly the said latches will both be temporarily swung downward just before the sections come to closed position and then will swing upward, bringing the parts to the position shown in Fig. 13. Although these latches are reversed from the position shown in the first form of my invention, their operation will be the same due to each latch having pivotally secured thereto as at 86 at a point below the fulcrum of the latch the forward end of the link 87 which is pivoted at 88 to the operating lever 89 depending from the end rail 90 of the front section. At the forward lower corner of each latch 78 is provided a forwardly projecting stop 91 which engages the vertical web of the bracket 83 immediately after the hook 79 of the latch has become disengaged from the front rail 77 of the rearward section. Accordingly forward motion imparted to either of the operating levers 89 will first unlock both of the latches 78 and then result in an initial forward movement being imparted to the whole front section. This initial movement will ordinarily be sufficient to move the front section far enough to bring into active operation the spring 91 connecting the forward and sliding right hand end of equalizing lever 72 and a point in effect upon the frame of the forward section a considerable distance to the left. The attachment at this end of the spring is conveniently made to a depending finger 92 provided upon the front rail 80. The left hand end of the other member 71 is pivoted to the horizontal web of the front rail 80 of the forward section towards the left hand end of the couch. The rearward ends of the two equalizing levers are attached respectively pivotally and slidingly upon short and long brackets provided upon the forward side of the front rail 77 of the rear section and with said rear ends of the said levers detachably mounted as by pins at the ends of said levers being removable or insertable in a hole and slot in said respective brackets all in the same manner as shown in the previous form of my invention and so not necessary to be described here in greater detail. As seen from the front of the forward section (see Fig. 12) this section has on its front rail 80 a depending bracket 93 which at its lower end has an inturned horizontal flange with a longitudinally extending slot in which pivots and slides the pin 94 at the forward end of equalizing lever 72 and the right hand end of the tension spring 91 is attached to the depending head of said pin 94.

In this modification of my invention there are also provided at each corner of the couch co-operating brackets or parts upon the forward section to support projecting parts upon the inner and lower section when the two bed sections are in closed position so that the two sections will not come apart vertically when the couch is lifted by persons lifting the larger and forward section. The front right hand co-operating pair of brackets and projections consist of the rearwardly facing web of bracket 93 functioning as a support to receive thereabove the slotted horizontal web of bracket 95 secured to the front side of the front rail 77 towards its right hand end. The left front pair of these members consist of an angle-shaped rest 96 secured to the front rail 80 of the forward section and having its horizontal web face rearwardly to receive thereabove the forwardly facing web of a similar angular bracket 97 mounted in line with bracket 96, but upon the front rail 77 of the rear bed section. At the rear corners of the couch and upon each of the two rear legs there is provided an angle bracket 98 extending a short distance toward the opposite end of the couch and on a line just below the lower edge of the end bar 74 of the back section.

Figs. 14 and 15 show my invention embodied in another modification in that the wheels 99 are mounted upon the four legs 100 of the lower and shorter section 101 which section accordingly is the movable one and will then usually be called the forward section and will be housed by being rolled back beneath the other or higher section 102. The general mechanical structure of this smaller section 101 is otherwise similar to the smaller section 69 shown in Fig. 11 and the general mechanical structure of the said higher and stationary section 102 is otherwise like the higher section 70 shown in Fig. 11 and the detachable and attachable connection between the two sections by means of equalizing levers and the locking of the sections in closed position is also preferably like that shown in Fig. 11 so that no detailed description of the parts of this modification is deemed necessary. This making of the lower section 101 the movable section shows that my invention is not limited to the lower section being the fixed section and also shows that my invention can be applied to situations and requirements where it is more convenient to have the lower section the movable one.

It will be seen that the two sections will be automatically locked by the operation of latch 78' and will be unlocked by the lever 89' similar respectively to the latch 78 and lever 89 in the construction shown in Figs. 11 and 13 but the lever 89' in the construction shown in Figs. 14 and 15 will not have the further operation of initially starting the outward movement of the movable section. This may conveniently be accomplished by a rigid handle 103 depending from the framework of the movable section 101 at each end thereof and conveniently reached by the operator so as to promptly start the initial movement of the movable section while the lever 89' is held in position to keep the latch 78' at unlocking position.

It will be noted especially that I have illustrated in the drawings herein various forms of supporting surfaces and spring structures for providing such supporting surfaces for the two sections; for instance in the first form of my invention by referring to Fig. 10 it will be seen that the lower and movable section 12 is provided with a spring structure composed of coiled springs with a simple fabric covering thereover. On the other hand, the higher or larger and stationary bed section 13 is provided with a system of coiled springs on top of which is a fibrous filling 34 over which is placed the fabric layer 33 which with the fibrous filling 34 may be tufted in the regular manner. In the modification shown in Fig. 11 the lower and smaller section 69 has a supporting surface at a higher level but composed of a slat or link fabric made resilient by the use of helical springs 75 connecting the opposite ends of the longitudinal slats or strips to the end bars 74 of this bed section. The structure providing the supporting surface for the higher and movable section 70 of the form shown in Fig. 11 is at its upper portion built like a spring-filled mattress in that the coiled springs 104 have thereabove a fibrous filling 105 with a final outer fabric covering 106 which is tufted or tied down to the filling 105. A thinner layer of strong fibrous filling 107 may be placed at the lower ends of the springs 104 but the fabric covering 106 comes down around the wood tacking strips as 108 at the front and 109 at the back and engages similar wood strips, not shown, at the ends of the section. In the modifications shown in Figs. 14 and 15 both the bed sections are provided with having a link or slat fabric at the top of the frames of the sections. With this modification there is illustrated the use of two cushions, one over each section when the sections are extended. These cushions will be in appearance like the cushion 14 already referred to in the first form of my invention and may be internally constructed by the use of helical springs forming essentially spring-filled mattresses but usually covered with better material so as to render their use as cushions in the day time practical.

Preferably the tension given to the spring 49 in the form shown in Fig. 5 and the similar operating spring 91 shown in the form illustrated in Fig. 12 will be adjustable so as to let the couch have its movable section, be subject to very little greater tension than is necessary to move the movable section outward upon the floor or other surface upon which the couch is to be used. For instance, on a smooth hardwood floor very little tension is required to move the movable section to its extended position. When the couch is placed, however, upon rugs or carpets having a deep nap considerable more power is required to make the couch open automatically. In the form of the construction shown in Fig. 5 the pin 50 to which the left hand end of the spring 49 is attached may be made adjustable, that is different screw-threaded holes may be provided therefor in the bottom front rail 27. At 50ᵃ a position of this pin is shown which will place the spring 49 under considerable greater tension. A similar result can be attained by making the depending bracket 92 shown in the structure illustrated in Fig. 12 adjustable lengthwise of the front rail 80. In dotted lines in this Fig. 12 is shown a position for said bracket that will place more tension upon the spring 91.

In many forms of my double bed couch the larger bed section will be provided with ornamental legs 110 depending from the tacking strip or other appropriate part of the bed section and generally harmonizing therewith in finish and color and practically concealing the metal legs and the anti-friction wheels. This detail is shown in Figs. 1 and 2 but for the sake of clearness in the drawings is not shown in the other views.

Figs. 18–23 illustrate three modified forms of my invention, the modifications consisting of variations in the method of attaching the operating spring to the equalizing levers and one of the bed sections or variations in both the form and attachment of the equalizing levers and the operating spring.

Fig. 18 is a plan view of a double bed couch wherein the bed sections in the main are similar to the construction shown in Figs. 11 to 13 and particularly where the equalizing levers are attached to the two bed sections the same as in the construction shown in Figs. 1 to 10, and in the construction shown in Figs. 11 to 13.

In the form shown in Fig. 18 the larger and movable section comprises a frame having a rear side rail 111, a front side rail 112 and opposite end rails 113. The smaller and fixed rear bed section comprises a frame having a rear side rail 114 and a front side rail 115 connected by opposite end rails 116. Each of these bed sections are provided adjacent their four corners with floor-engaging legs (not shown) but supporting each section at all positions independently upon the floor as already explained in other forms of my invention.

In this view the rear and fixed bed section is shown in solid lines nearly in its open or extended position and is shown in dotted lines in a position nearly closed. To avoid duplicating the drawings this nearly closed position of the bed sections is shown by moving the smaller and fixed bed section almost under the larger and movable section. These bed sections are operatively connected by a pair of equalizing levers 117 and 118 pivotally connected to each other as by pin 119 at the center of said levers. The operating spring 120 is in effect connected to this pivoting pin 119 by a short link 121 while the back end of the spring is attached to the middle of the back rail 111 of the movable bed section as at 122. The parts and particularly the spring 120 is so proportioned that the spring is stretched or placed under tension when the bed sections are in closed position and so exerts a power to open or greatly help in opening the bed sections; that is to move the forward or movable bed section outward from the fixed or rear section. It will be apparent that when the sections are moved from the full-line or nearly open position of Fig. 18 to the closed position the equalizing levers 117 and 118 will be folded upon each other a little more than shown in the dotted-lined position of the parts and that this will bring the pivoting pin 119 considerably farther away from the back rail 111 of the front section and so place the spring under tension. The equalizing levers 117 and 118 are detachably connected to the smaller section as described for Figs. 3–10.

The modification shown in Figs. 19 and 20 consists in having the equalizing levers 123 and 124 unfolded or at a considerable angle to each other when the bed sections are closed as suggested by the full-lined position of the parts in Fig. 19 and to have the said levers folded upon each other when the bed sections are in extended position. In this construction the larger or movable section has a frame composed of the front rail 125, back rail 126 and opposite end rails 127. The smaller and back section is composed of a front rail 128, a back rail 129 and opposite end rails 130. The left hand end of lever 124 is pivoted as by pin 134 engaging a hole in bracket 135 on the front of the front rail 128 of the smaller section and the right hand end of lever 123 is pivotally and slidingly mounted in effect on the right hand end of rail 128 as by means of pin 136 sliding and rotating in slot 137 in long bracket 138 mounted on the front of said front rail 128 (following the construction shown in Fig. 3). The left hand end of lever 123 is pivoted as by pin 131 to the back rail 126 of the larger bed section near its left end while the right hand end of lever 124 is pivotally and slidingly mounted upon the right hand end of the said back rail 126 of the larger section as by a pin 132 sliding and pivoting in slot 133 in the back rail 126 of the movable or front bed section. Having these last two mentioned points of attachment on the back rail of the front section (instead of on the front rail of said movable section as in Fig. 3) results in the said levers being unfolded when the bed sections are closed. In Fig. 19 in full lines there is shown the relative position of the sections when they are almost closed. In dotted lines is shown this position of the parts when the movable section has been moved nearly to opened position by drawing it forwardly. It will be seen that the levers 123 and 124 are not quite closed but that in continuing the opening movement of the movable section the said levers will be moved to fully overlapping position and then past that position a little until the back rail 126 of the front or movable section is spaced a little in front of the front rail 128 of the smaller or back section which is the fully extended position of the bed sections as appears in Fig. 3 with reference to the first form of this double bed couch. Due to this reversed attachment of the equalizing levers in this form of my invention the operating spring 139 attached to the sliding end of lever 124 is secured at its other end at a point 140 beyond or to the right of the lever and so still operates to exert a tension to move the movable section to outward or extended position. It will be seen by reference to Fig. 19 that the spring 139 is stretched more when the bed sections are closed than when the sections are opened. In this construction the sections are readily entirely separated by reason of the pins 134 and 136 being detachable from their respective apertures as already described for the previous forms of my invention.

In this form of my invention as will be seen by reference to Figs. 19 and 22 the lever 123 is one continuous integral lever but the lever 124 is formed in two halves having their inner ends 141 and 142 respectively on top of and below the other lever 123 at the crossing points of said levers and these ends are rigidly secured to the opposite ends 143 and 144 of a double-ended rivet 145. The construction of these parts and this joint is shown in Figs. 21 and 22. The central part of rivet 145 is round to fit and rotate in hole 146 of lever 123. The flattened end 143 of the rivet establishes a rigid joint between the upper or right hand half of lever 124 and the rivet while the flattened end 144 of the rivet establishes a rigid joint between the rivet 145 and the left hand and lower half of the lever 124 and consequently the two halves of the lever 124 are rigidly connected to each other, but on opposite sides of the lever 123. This construction of the lever 124 allows the levers 123 and 124 to pass each other at center when the bed sections are moved from closed to extended positon or from extended to closed position. Fig. 22 is an enlarged sectional view on line 22—22 of Fig. 19.

Figs. 23 and 24 are views similar to Figs. 19 and 20 of another modified form of this invention. In this form the parts and construction are the same as in the form shown in Figs. 19 and 20 and already described except that the operating spring 147 operatively connects the central pivoting pin 145 of the operating levers 149 and 150 and the right hand end of the frame preferably the back rail 151 of the movable section. Preferably a flat link 152 is interposed between said pivoting pin 148 and the spring 147 to prevent the spring from being caught or damaged by the coming together of the equalizing levers. Also a flat link 153 may be used between the other end of the spring and the said frame of the movable section. In this last modification of my invention the two bed sections are also readily attachably and detachably connected by the ends of the equalizing levers 149 and 150 that engage the first-entering side of the smaller section being attachably and detachably secured as by depending pins removably inserted in their respective hole or slot as already described for other forms of my couch.

What I claim as new and desire to secure by Letters Patent is:

For use with a double bed couch comprising two bed sections, one of said sections being adapted to be housed under the other, or to be located therebeside by relative transverse movement of the sections, and a spring operatively connecting said bed sections and placed under tension on the closing of said sections and tending to open said sections, the combination of a rock shaft mounted on the movable bed section and extending longitudinally thereof, latches rigidly mounted on said shaft near the opposite ends thereof, said latches normally moving by gravity into position to hold a member of the other bed section when the sections are closed, stops limiting the swinging movement of said latches and shaft after the latches are disengaged from their cooperating members on the other bed section, a release lever at each end of the movable bed section and a connecting rod from each release lever to the latch at that end of the bed section whereby operation of either release lever operates to disengage both latches and thereafter through said latches engaging said stops to impart an initial outward movement to the movable section.

WILLIAM B. FOSTER.